(12) United States Patent
Morimoto

(10) Patent No.: US 9,823,269 B2
(45) Date of Patent: Nov. 21, 2017

(54) SURFACE ANALYZER

(75) Inventor: Takashi Morimoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 13/230,644

(22) Filed: Sep. 12, 2011

(65) Prior Publication Data

US 2012/0062592 A1    Mar. 15, 2012

(30) Foreign Application Priority Data

Sep. 15, 2010 (JP) ................. 2010-206844

(51) Int. Cl.
*G01Q 30/04* (2010.01)
*B82Y 35/00* (2011.01)

(52) U.S. Cl.
CPC ............ *G01Q 30/04* (2013.01); *B82Y 35/00* (2013.01)

(58) Field of Classification Search
USPC .......................................... 345/440
See application file for complete search history.

(56) References Cited

U.S. PATENT DOCUMENTS

| 8,212,871 B2 * | 7/2012 | Tonogai et al. ............... 348/136 |
| 2003/0067496 A1 * | 4/2003 | Tasker .................... H01J 37/28 715/846 |
| 2008/0048115 A1 * | 2/2008 | Iyoki ...................... B82Y 35/00 250/306 |
| 2008/0204476 A1 * | 8/2008 | Montague .................... 345/661 |

(Continued)

FOREIGN PATENT DOCUMENTS

| JP | 2002-350320 A | 12/2002 |
| JP | 2005233669 | * 9/2005 ............. G01N 13/10 |
| JP | 2008-139795 | 6/2008 |

(Continued)

OTHER PUBLICATIONS

Bier, Eric A., et al. "Toolglass and magic lenses: the see-through interface." Proceedings of the 20th annual conference on Computer graphics and interactive techniques. ACM, 1993.*

(Continued)

*Primary Examiner* — Vu Nguyen
(74) *Attorney, Agent, or Firm* — Morgan, Lewis & Bockius LLP

(57) ABSTRACT

A technique for allowing users to efficiently specify a region of interest (ROI) on a sample for a certain physical quantity (e.g. phase) other than the altitude is provided. A range-indicating image showing a range that can be observed on a sample is displayed on a navigation window in a sample observation display screen. An ROI-indicating frame for specifying a magnified observation range is superposed on the range-indicating image. A list of thumbnails of previously taken magnified images for the same sample is displayed on an image history display window. When an observer selects any image from this list, the thumbnail of the selected image is mapped onto the range-indicating image. With reference to this image, the observer can change the position, size and/or angle of the ROI-indicating frame by a mouse operation. In response to this operation, a magnified image of the sample within the new ROI is acquired.

3 Claims, 4 Drawing Sheets
(2 of 4 Drawing Sheet(s) Filed in Color)

(56) References Cited

U.S. PATENT DOCUMENTS

2011/0191014 A1* 8/2011 Feng et al. .................... 701/200

FOREIGN PATENT DOCUMENTS

JP      2010-054420      3/2010
WO     2010/089960 A1    8/2010

OTHER PUBLICATIONS

Stone, Maureen C., Ken Fishkin, and Eric A. Bier. "The movable filter as a user interface tool." Proceedings of the SIGCHI conference on Human factors in computing systems: celebrating interdependence. ACM, 1994.*
Cockburn, Andy, Amy Karlson, and Benjamin B. Bederson. "A review of overview+ detail, zooming, and focus+ context interfaces." ACM Computing Surveys (CSUR) 41.1 (2008): 2.*
JP2002350320 (machine translation).*
Japanese Office Action dated Jul. 30, 2013 for corresponding Japanese Patent App. No. 2010-206844.
English translation of "Reason for Rejection" in Japanese Office Action dated Jul. 30, 2013 for corresponding Japanese Patent App. No. 2010-206844.
Chinese Office Action dated Nov. 29, 2013 for corresponding Chinese Patent App. No. 201110276239.8. English translation of the Reason for Rejection.
Japanese Office Action dated Feb. 12, 2014 for corresponding Japanese Patent Application No. 2010-206844 and the English translation of "Reason for Rejection" (3 pages).
Examination Report received for Chinese Patent Application No. 201110276239.8, dated Sep. 29, 2014, 11 pages (5 pages of English Translation and 6 pages).

* cited by examiner

ALTITUDE IMAGE

PHASE IMAGE

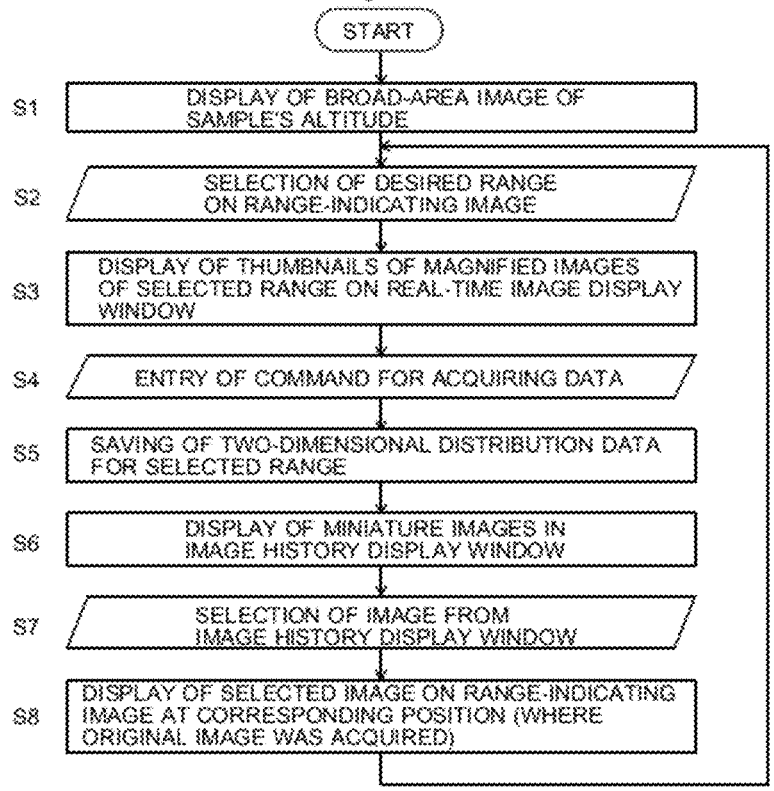
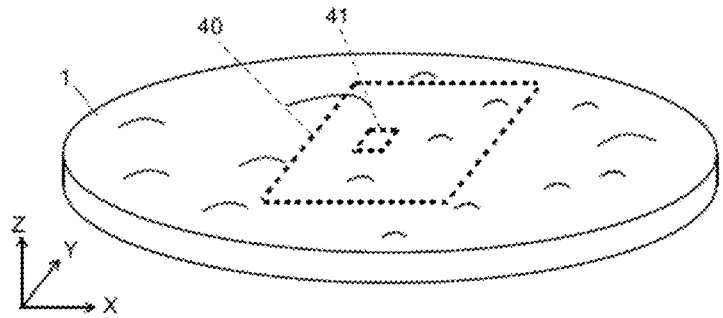

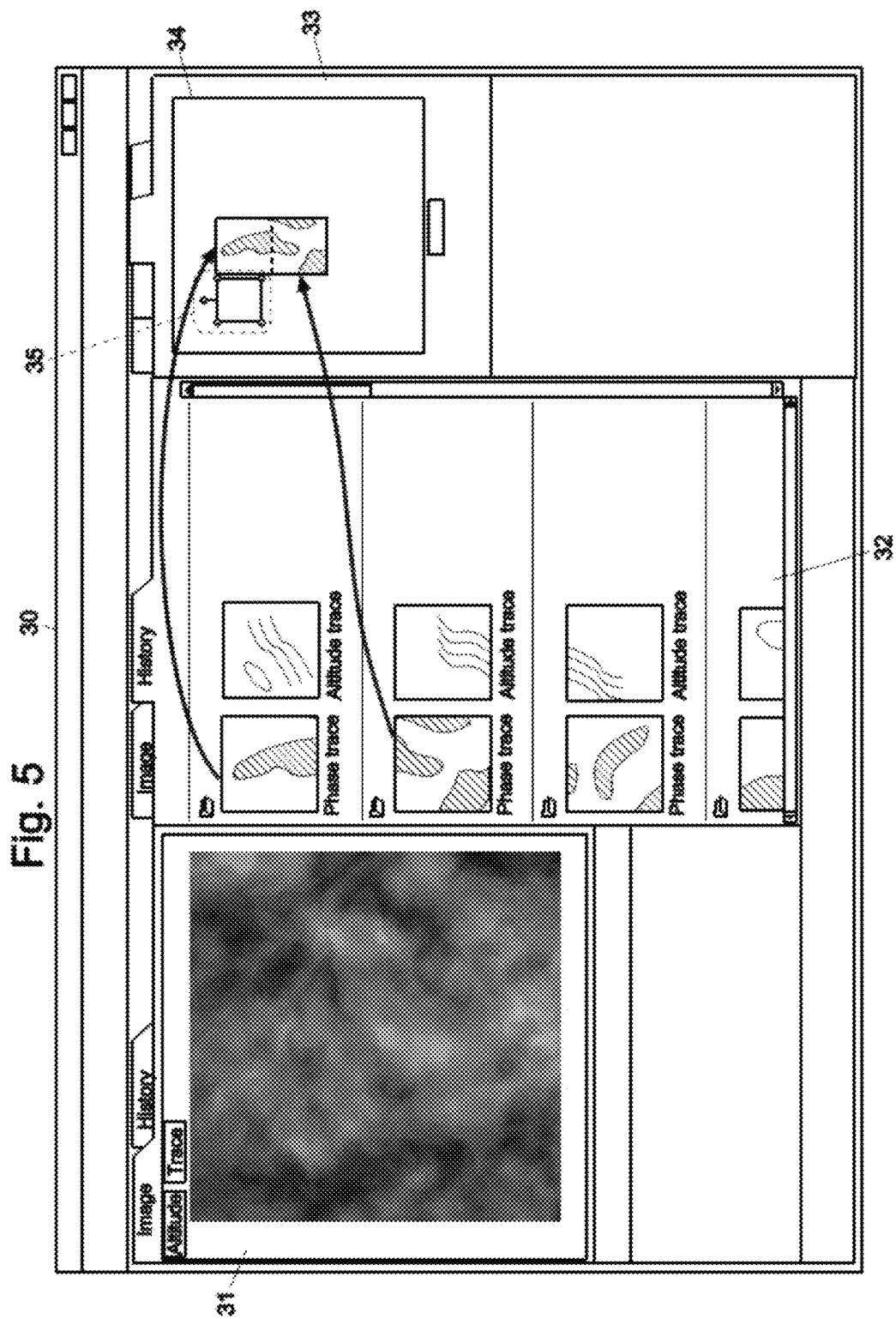

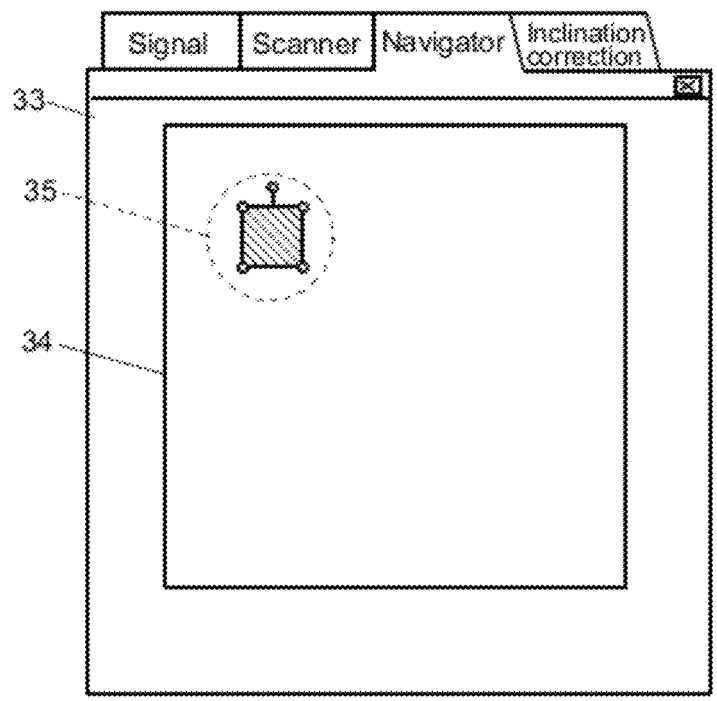
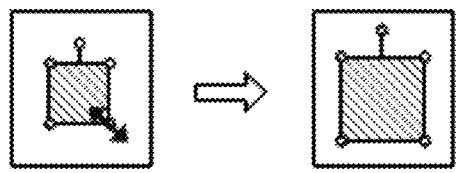
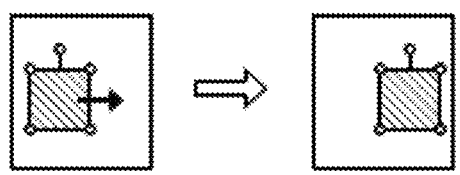
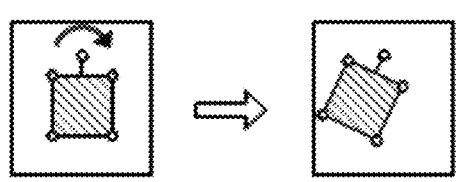

SURFACE ANALYZER

TECHNICAL FIELD

The present invention relates to a surface analyzer capable of acquiring two-dimensional distribution data of different kinds of physical quantities on a predetermined area of a sample. Typical examples of such surface analyzers include scanning probe microscopes, laser microscopes and electron probe micro analyzers.

BACKGROUND ART

An observation of a sample surface using a microscope normally includes a first step of taking a low-magnification image (broad-area image) with a large visual field on a sample, displaying the broad-area image on a display screen to allow an observer to search for a desired portion on the sample, and a second step of performing a magnified observation to acquire a magnified image with a smaller visual field including the desired portion, displaying the magnified image. To improve the efficiency of such operations, various techniques have been developed and proposed.

For example, Patent Document 1 discloses a technique in which a broad-area image with low magnification and a magnified image with high magnification are simultaneously displayed on the same display screen, with a rectangular frame or similar graphical element shown on the broad-area image to indicate the area corresponding to the currently shown magnified image or a previously taken magnified image. With this technique, the observer can easily grasp the positional relationship between the region of interest (ROI) and a broader area on the sample or the positional information of a previously observed or measured area.

A scanning probe microscope (SPM), which is one of the typical surface analyzers, is a device for scanning the surface of a sample with a micro-sized probe and detecting a force resulting from the interaction between the surface and the probe. This device is capable of collecting, for the same area on a sample, not only information on the altitude (surface height or surface shape) but also two-dimensional distribution data of various kinds of physical quantities, such as phase, electric current, viscoelasticity, magnetic force, surface potential or electrostatic force (see Patent Document 2). Therefore, when specifying a region of interest on the sample for the next measurement, SPM users often desire to refer to a previously obtained two-dimensional distribution data of a certain physical quantity other than the altitude, i.e. an image showing the distribution of that physical quantity.

Such a demand cannot be fully satisfied by the image-displaying method described in Patent Document 1. That is to say, the method merely provides a broad-area image showing the surface shape (altitude image) of a sample with low magnification, with a frame or similar graphical element indicating an area corresponding to a magnified image on the broad-area image. With this system, when specifying a region of interest based on a previously taken observation image showing a certain physical quantity other than the altitude, the observer must specify the region of interest by visually comparing the frame on the broad-area image and the previously taken image showing the distribution of the physical quantity concerned. Such a task of specifying a region of interest while visually comparing two or more images is cumbersome for observers and may cause an error in judgment.

Even when a broad-area image showing the altitude and a magnified observation image showing a certain physical quantity different from the altitude are simultaneously shown on the same display screen, it is difficult to know which portion on the broad-area image corresponds to the magnified observation image selected or specified by the observer. Therefore, when the user wants to observe the distribution of a certain physical quantity on a desired portion of the sample while grasping the positional relationship of a plurality of magnified observation images which were previously taken for a certain physical quantity, the task will be very time-consuming and inefficient.

BACKGROUND ART DOCUMENT

Patent Document

Patent Document 1: JP-A 2008-139795
Patent Document 2: JP-A 2010-54420

DISCLOSURE OF THE INVENTION

Problem to be Solved by the Invention

The present invention has been developed to solve the previously described problem, and the primary objective thereof is to provide a surface analyzer capable of helping users to easily grasp the positional relationship between an area that can be observed on a sample and a magnified observation image of a certain physical quantity on a display screen. For example, the surface analyzer should allow users to easily, quickly and correctly select a region of interest for the next measurement while visually checking a magnified observation image of a certain physical quantity at any location within the area that can be observed.

Means for Solving the Problems

The present invention aimed at solving the aforementioned problem is a surface analyzer capable of obtaining two-dimensional distribution information of different kinds of physical quantities for an arbitrary area on a sample, including:

a) a first display processor for displaying a two-dimensional range-indicating image for indicating a range that can be observed or measured on a sample; and b) a second display processor for creating a distribution image based on the two-dimensional distribution information of a certain physical quantity obtained for a range of any size located at any position within the range that can be observed or measured on the sample, and for superposing the distribution image on a corresponding position on the range-indicating image displayed by the first display processor.

For example, when the surface analyzer according to the present invention is constructed as an SPM, the "different kinds of physical quantities" include the altitude, phase, electric current, viscoelasticity, magnetic force, surface potential and/or electrostatic force.

The first and second display processors in the surface analyzer according to the present invention are typically realized by executing a dedicated controlling and processing software program installed on a personal computer included in a system of the surface analyzer.

In the surface analyzer according to the present invention, the range-indicating image shown on the display screen by the first display processor may be an image that contains no substantial image information and merely shows the position and size of the entire range that can be observed or measured on the sample. Alternatively, it may be an image that contains substantial image information, such as the altitude, over the entire range that can be observed or measured on the sample. The second display processor creates a distribution image based on two-dimensional distribution information of a certain physical quantity obtained by an observation or measurement of a sample (e.g. the phase, for an SPM) and superposes the distribution image on the range-indicating image at a position corresponding to the position on the sample where the aforementioned information was obtained. When a plurality of distribution images obtained for the same physical quantity are superposed on the range-indicating image in such a manner that they completely cover the range-indicating image, the images arranged on the display screen will form one image that shows the distribution of that physical quantity over the entire range that can be observed or measured.

In the surface analyzer according to the present invention, one or more previously taken distribution images of a certain physical quantity are superposed on a range-indicating image showing the entire range that can be observed or measured on the sample. From the displayed images, users (observers) can quickly and easily grasp various kinds of positional relationships, such as the positional relationship between one or more distribution images and the entire range that can be observed or measured, the positional relationship among a plurality of distribution images, or the location of a portion which is within the range that can be observed or measured and which has not yet been subjected to a magnified observation or measurement.

In one mode of the present invention, the surface analyzer further includes:

a list display processor for creating an image list including one or more distribution images based on two-dimensional distribution information of a certain physical quantity obtained for a range of an arbitrary size located at an arbitrary position within the range that can be observed or measured on a sample, and for displaying the image list on a display area apart from the display area of the range-indicating image on the same display screen where the range-indicating image is displayed; and an image selector for allowing a user to select any one or more distribution images included in the image list displayed by the list display processor, wherein the second display processor superposes each distribution image selected through the image selector on a corresponding position on the range-indicating image.

With this surface analyzer, one or more distribution images previously taken for a certain physical quantity can be easily selected from the image list and superposed on the range-indicating image. Therefore, users can correctly and efficiently observe the distribution of a certain physical quantity on a desired portion of the sample while grasping, for example, the positional relationship among a plurality of distribution images.

In one preferable mode of the present invention, the surface analyzer further includes:

a range specifier for allowing a user to specify a range visually discriminable from other portions on the range-indicating image displayed by the first display processor; and a controller for controlling a measurement device so as to obtain two-dimensional distribution information of a certain physical quantity for an area on the sample corresponding to the range specified through the range specifier.

When the present invention is applied to an SPM, the measurement device includes a cantilever with a tip at which a probe for scanning a sample surface is provided, a scanner for three-dimensionally moving a sample in the X, Y and Z directions, a detector for detecting an amount of the movement of the probe in the Z direction, and so on.

In this surface analyzer, when a user specifies, through a graphical user interface, a portion to be observed on the range-indicating image, the controller determines the position and size (range) on the sample to be subjected to the measurement according to the specification and controls the measurement device to perform the measurement on the specified range. Therefore, while visually checking a distribution image obtained by a previous observation or measurement, the user can easily and quickly specify a portion to be subsequently observed or measured on the same image so as to obtain an image of that portion by the next observation or measurement.

In one preferable mode of the previous surface analyzer, the range specifier displays a rectangular frame on the range-indicating image and allows users to translate, resize and rotate the rectangular frame so as to specify a range to be analyzed. For example, the range specifier allows users to translate, resize and/or rotate the rectangular frame on the range-indicating image by the operation of a pointing device, such as a mouse.

Translating the rectangular frame means changing the position of the portion to be subjected to an observation or measurement on the sample. Resizing the rectangular frame means changing the size of the portion to be subjected to an observation or measurement on the sample. Rotating the rectangular frame means changing the direction in which the observation or measurement of the portion on the sample should be made. For example, if the surface analyzer is an SPM, rotating the rectangular frame means changing the scan direction.

In the case of observing a sample having a characteristic structure, such as a diffraction grating with straight grooves formed thereon, the orientation of the sample with respect to the scan direction is essential. SPMs are normally capable of changing the scan direction. Therefore, for the purpose of analysis or evaluation, it is beneficial to provide a function for specifying the scan direction in the process of setting a region of interest and for acquiring and displaying images based on that scan direction in the previously described manner.

Effect of the Invention

As described thus far, with the surface analyzer according to the present invention, users can quickly and easily grasp various kinds of positional relationships, such as the positional relationship between one or more distribution images of a certain physical quantity obtained for small ranges and the entire range that can be observed or measured, the positional relationship among a plurality of distribution images, or the location of a portion which is within the range that can be observed or measured and which has not yet been subjected to a magnified observation or measurement. Therefore, users can efficiently perform necessary operations for the observation or measurement of a sample surface. The number of operational errors resulting from visual comparison of a plurality of images or other reasons will also be reduced.

BRIEF DESCRIPTION OF THE DRAWINGS

The file of this patent contains at least one drawing executed in color. Copies of this patent with color drawings will be provided by the Office upon request and payment of the necessary fee.

FIG. 3 is a flowchart showing one example of the steps of operations and processes in a sample observation characteristic of the SPM of the present embodiment.

FIG. 4 is a diagram illustrating the relationship between a range that can be observed on a sample and an actually observed range.

FIG. 5 is a schematic diagram showing one example of a display screen used in the sample observation process characteristic of the SPM of the present embodiment.

FIG. 6 is an enlarged view of the navigation window shown in FIG. 5.

FIGS. 7A-7C are diagrams illustrating various operations that can be performed on an RO-setting frame displayed in the navigation window shown in FIG. 6.

BEST MODE FOR CARRYING OUT THE INVENTION

Figure 1:
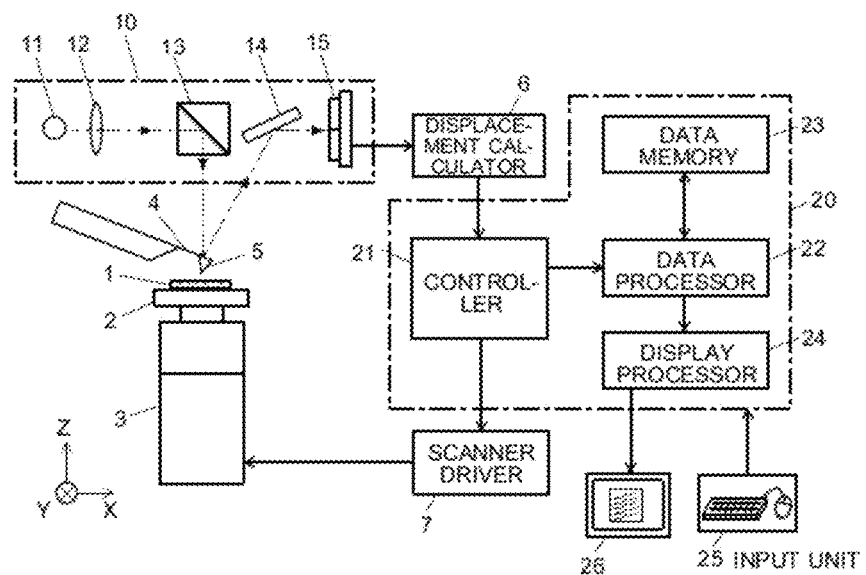
FIG. 1 is a configuration diagram showing the main components of a scanning probe microscope (SPM) as one embodiment of the present invention.

A scanning probe microscope (SPM) as one embodiment of the surface analyzer according to the present invention is hereinafter described with reference to the attached drawings. FIG. 1 is a configuration diagram showing the main components of the SPM in accordance with the present embodiment.

A sample 1 to be observed is placed on a sample stage 2 mounted on the upper end of a substantially cylindrical scanner 3. The scanner 3 has a plurality of piezoelectric elements and is capable of moving the sample 1 in the X and Y directions as well as finely adjusting its position in the Z direction in accordance with voltages applied from a scanner driver 7. A cantilever 4 having a probe at its tip is located above the sample 1. The cantilever 4 is driven to oscillate by an exciter including a piezoelectric element (not shown). Located above the cantilever 4 is a displacement detection unit 10 for detecting the displacement of the cantilever 4 in the Z direction. The displacement detection unit 10 includes a laser source 11, lens 12, beam splitter 13, mirror 14, photodetector 15 and other elements. In this displacement detection unit 10, a laser beam emitted from the laser source 11 and converged by the lens 12 is reflected by the beam splitter 13, to be cast onto the tip of the cantilever 4 and thereby reflected. The reflected light is received by the mirror 14 and redirected to the photodetector 15, which has a light-receiving plane divided into a plurality of sections arrayed in the displacement direction of the cantilever 4 (i.e. the Z direction).

For example, in a DFM (Dynamic Force Mode) observation, the cantilever 4 is oscillated in the Z direction at a frequency f near its resonance point. In this state, when an attractive or repulsive force due to an interatomic force or other factor acts between the probe 5 and the surface of the sample 1, the oscillation amplitude of the cantilever 4 changes. A displacement of the cantilever 4 in the Z direction causes a change in the proportion of the amounts of light falling onto the plural sections of the light-receiving plane of the photodetector 15. A displacement calculator 6 calculates the amount of displacement of the cantilever 4 by processing the detection signals corresponding to the amounts of light, and sends the obtained value to the controller 21.

The controller 21 calculates a voltage value for slightly changing the position of the scanner 3 in the Z direction via the scanner driver 7 so as to cancel the displacement of the cantilever 4, i.e. so as to maintain a constant distance between the probe 5 and the surface of the sample 1. The calculated voltage is sent to the scanner driver 7, whereby the position of the scanner 3 in the Z direction is finely adjusted. The controller 21 also calculates voltage values for the X and Y directions so as to move the sample 1 relative to the probe 5 in the X-Y plane according to a predetermined scan pattern, thereby finely adjusting the position of the scanner 3 in the X and Y directions via the scanner driver 7. A signal reflecting the amount of feedback in the Z direction (scanner voltage) is sent from the controller 21 to a data processor 22, which processes this signal at each point (X, Y) to calculate a data corresponding to the altitude or another physical quantity of the sample 1. Based on this data, a display processor 24 creates a two-dimensional image or the like and displays it on the screen of a display unit 26. The obtained data is stored in the data memory 23.

The SPM in the present embodiment is capable of performing not only the measurement of the altitude (i.e. surface shape) of the sample 1 but also simultaneously the measurement of another physical quantity, such as the phase, electric current, magnetic force or surface potential. These additional data are also stored in the data memory 23. The controller 21, data processor 22, data memory 23, display processor 24 and other components are embodied by a personal computer 20. The previously described data-collecting operation, and an image-displaying process described later, can be carried out by running a dedicated controlling and processing software program installed in the computer 20 beforehand.

An image-displaying process characteristic of a sample observation by the SPM of the present embodiment, and a measurement control based on an image displayed in that process, are hereinafter described.

FIG. 3 is a flowchart showing one example of the operating and processing steps in a sample observation characteristic of the SPM of the present embodiment, FIG. 4 is a diagram illustrating the relationship between a range that can be observed on a sample and an actually observed range, FIG. 5 is a schematic diagram showing one example of a display screen used in the sample observation process characteristic of the SPM of the present embodiment, FIG. 6 is an enlarged view of the navigation window shown in FIG. 5, and FIGS. 7A-7C are diagrams illustrating various operations that can be performed on an ROI-indicating frame displayed in the navigation window shown in FIG. 6.

Figure 2A:
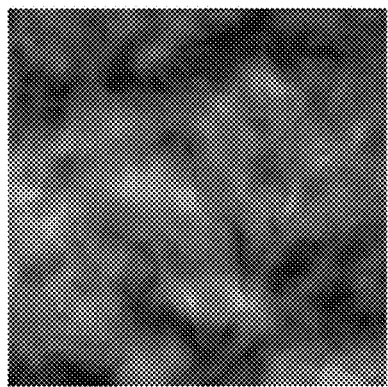
FIGS. 2A and 2B are photographic images showing one example of an altitude image and a phase image taken with an SPM.
Figure 2B:

The following description deals with the case where the SPM is used so as to perform a two-dimensional measurement of not only the altitude of the sample 1 but also the phase on the surface and create a magnified image showing the phase distribution. The "phase" is the phase shift (delay) between the voltage signal for oscillating the cantilever 4 and the actual oscillation signal. The phase reflects a difference in a certain physical property of the surface of the sample 1, such as the viscoelasticity or adsorption property. FIGS. 2A and 2B are photographic images showing one example of an altitude image and a phase image taken with an SPM for the same area on a sample.

As shown in FIG. 5, a sample observation display screen 30 has a real-time image display window 31 for displaying a real-time image (magnified image), a image history display window 32 for displaying a list of miniature versions (thumbnails) of previously taken magnified images of the same sample 1 and stored in the data memory 23, and a navigation window 33 which shows the positional relationship between the entire observation range on the sample 1 and the previously taken magnified image and on which users can specify the next measurement range. As already stated, the present system simultaneously acquires the altitude image and the phase image of the sample 1. Accordingly, the altitude images and the phase images of the same area are listed in the image history display window 32. Naturally, the arrangement of the windows 31, 32 and 33 in the sample observation display screen 30 is not limited to this form.

As shown in FIGS. 5 and 6, the navigation window 33 displays a range-indicating image 34 which illustrates a rectangular frame indicating the range that can be observed on the sample 1 at that point in time. A rectangular ROI-indicating frame 35 for allowing users to set a region of interest (ROI) for observation is superposed on the range-indicating image 34. The ROI-indicating frame 35 is a GUI (Graphical User Interface) component that can be manipulated with a mouse or similar pointing device included in the input unit 25. That is to say, as shown in FIGS. 7A and 7B, the ROI-indicating frame 35 can be resized by a drag-and-drop operation of the mouse on any one of the four corners of the frame (FIG. 7A) or translated by a drag-and-drop operation on the entire frame (FIG. 7B). Furthermore, as shown in FIG. 7C, when a rotational manipulation mode is selected, the ROI-indicating frame 35 can be rotated around the point located above the frame 35 by an arbitrary angle by moving the mouse pointer around the aforementioned point.

The range-indicating image 34 in the navigation window 33 corresponds to the range that can be observed on the sample, which is denoted by numeral 40 in FIG. 4. That is to say, the observable range 40 is the entire range that can be scanned with the probe 5 driven by the scanner 3 in the X and Y directions. The smaller range 41 shown by the dotted line within the observable range 40 in FIG. 4 corresponds to the range to be actually scanned and observed with the probe 5 according to the range specification through the ROI-indicating frame 35 as will be described later.

The steps of a sample observation characteristic of the SPM of the present embodiment are hereinafter described with reference to FIG. 3. Initially, an observer enters through the input unit 25 a command for initiating an observation of a altitude over the entire observable range 40 on the sample 1. Upon receiving this command, the controller 21 operates the scanner 3 via the scanner driver 7 so as to scan the entire observable range 40 with the probe 5. As a result, a two-dimensional distribution data on the altitude of the sample 1 is obtained for the entire observable range 40 in the data processor 22. Based on this data, the display processor 24 creates a two-dimensional altitude image and shows this image (which is a broad-area image showing the sample's altitude) on the real-time image display window 31 in the sample observation display screen 30 on the screen of the display unit 26 (Step S1). From this image, the observer can roughly grasp the altitude of the entire observable range 40 on the sample 1.

With reference to the broad-area image showing the sample's altitude on the real-time image display window 31, the observer can perform the aforementioned mouse manipulations to arbitrarily change the position, size and/or angle (direction) of the ROI-indicating frame 35 on the range-indicating image 34 so as to set the region of interest on the sample 1 to be observed with a high magnification (Step S2). According to the setting of the ROI-indicating frame 35, the controller 21 operates the scanner 3 via the scanner driver 7 so that only a small range on the sample 1 corresponding to the ROI-indicating frame 35 will be scanned with the probe 5. As a result, a two-dimensional altitude distribution data and a two-dimensional phase distribution data for the aforementioned small range are obtained in the data processor 22. Based on these data, the display processor 24 creates a two-dimensional altitude image and shows this image (which is a broad-area image showing the sample's altitude) on the real-time image display window 31 in the sample observation display screen 30 on the screen of the display unit 26 (Step S3).

At this point, the obtained data are not yet stored in the data memory 23 and the observer may appropriately change the position, size and/or angle of the ROI-indicating frame 35 on the range-indicating image 34. When such a change is made, the range actually scanned with the probe 5 correspondingly changes and the magnified image shown in the real-time image display window 31 is updated. After the ROI-indicating frame 35 is set, when the observer enters, through the input unit 25, a command for acquiring data, the data obtained at that point in time, i.e. the two-dimensional distribution data on the altitude and the two-dimensional distribution data on the phase for the small area corresponding to the ROI-indicating frame 35 at that point in time, are stored in the data memory 23 (Steps S4 and S5). Additionally, a positional data, which indicates, for example, the relative position within the observable range 40 on the sample 1, is also stored so as to identify the position at which the aforementioned two-dimensional data have been obtained.

Based on the data stored in the data memory 23 in the previously described manner, the display processor 24 creates thumbnails of the magnified images of the altitude and those of the phase on the sample surface and displays the thumbnails in the image history display window 32 in the sample observation display screen 30 (Step S6). That is to say, the image history display window 32 is used to display thumbnails of previously taken magnified images showing various kinds of physical quantities (e.g. the altitude and phase on the sample surface in the present case) of the same sample.

On the image history display window 32, the observer selects any one or more images (thumbnails) and moves them onto the range-indicating image 34 by an operation using the input unit 25 (Step S7). In response to this operation, the display processor 24 retrieves, from the data memory 23, the positional data associated with the two-dimensional distribution data from which the selected images were created. Based on the retrieved positional data, the display processor 24 arranges the thumbnails on the range-indicating image 34 in such a manner that their positions relative to this image 34 correspond to their original positions on the observable range 40 (Step S8). This means that thumbnails of magnified images corresponding to small areas are mapped onto the range-indicating image 34. On the resultant image, the positional relationship between the previously taken magnified images and the observable range on the sample indicated by the frame of the range-indicating image 34 can be quickly and visually grasped, as shown in FIG. 5.

While visually checking the range-indicating image 34 onto which previously taken images have been mapped, the observer may want to acquire a magnified image of another portion within the observable range 40 on the sample 1. In such a case, the observer can return to Step S2 and change the position and/or other properties of the ROI-indicating frame 35 on the range-indicating image 34 by a mouse operation to set a new region of interest. Subsequently, the newly set small area (region of interest) on the sample 1 is scanned with the probe 5 in the previously described manner to collect two-dimensional distribution data of the altitude and phase on that small area of the sample. After the scan is completed, thumbnails of the magnified images created from the new data are added to the image history display window 32.

In the example of FIG. 5, only two thumbnails of phase images are superposed on the range-indicating image 34. It is possible to collect detailed two-dimensional distribution data on the sample's altitude and phase over the entire observable range 40 of the sample 1 by repeatedly collecting data while setting the ROI-indicating frame 35 for each of the unmapped regions. However, in many cases, what is required is to collect two-dimensional distribution data of the sample's altitude and phase for an area near a limited region on the sample 1. In such a case, the observation can be completed when the desired data have been collected.

In the example of FIG. 5, the thumbnails selected from the image history display window 32 and displayed on the range-indicating image 34 show the same kind of physical quantity, i.e. the phase. However, it is possible to select thumbnails of magnified images showing different kinds of physical quantities and display them together on the range-indicating image 34. Furthermore, as already noted, the previously described processes and operations can be performed for not only the sample's altitude and phase but also any kind of physical quantity that can be observed or measured with the SPM.

Although an SPM was taken as an example in the previous embodiment, it is obvious that the present invention can be generally applied to any surface analyzer capable of measuring a two-dimensional distribution of different kinds of physical quantities within a predetermined area on the surface of a sample. Examples of such surface analyzers include laser microscopes and electron probe micro analyzers.

It should be noted that the previous embodiment is a mere example of the present invention, and any change, modification or addition appropriately made within the spirit of the present invention will evidently fall within the scope of claims of the present patent application.

EXPLANATION OF NUMERALS

1 . . . Sample
2 . . . Sample Stage
3 . . . Scanner
4 . . . Cantilever
5 . . . Probe
6 . . . Displacement Calculator
7 . . . Scanner Driver
10 . . . Displacement Detector
11 . . . Laser Source
12 . . . lens
13 . . . Beam Splitter
14 . . . Mirror
15 . . . Photodetector
20 . . . Personal Computer
21 . . . Controller
22 . . . Data Processor
23 . . . Data Memory
24 . . . Display Processor
25 . . . Input Unit
26 . . . Display Unit
30 . . . Sample Observation Display Screen
31 . . . Real-Time Image Display Window
32 . . . Image History Display Window
33 . . . Navigation Window
34 . . . Range-Indicating Image
35 . . . ROI-Setting Frame

The invention claimed is:

1. A surface analyzer for microscopy, comprising:
a sample stage for placing the sample;
a detection unit for obtaining information of one or more different kinds of physical quantities from the sample on the sample stage;
a controller for receiving the information of one or more different kinds of physical quantities from the detection unit;
a cylindrical scanner on which the sample stage is mounted, wherein the scanner has a plurality of elements for moving the sample;
a cantilever having a probe at its tip disposed over the sample; and
a display processor for microscopy configured to display, based on the information of one or more different kinds of physical quantities from the controller, a two-dimensional range-indicating image indicating an entire range capable of being scanned with the probe, and configured to create a distribution image of the one or more different kinds of physical quantities obtained for a range of any size located at any position within the two-dimensional range-indicating image, and configured to superpose the distribution image on a corresponding position on the range-indicating image, said the one or more physical quantities being phase, electric current, viscoelasticity, magnetic force, surface potential and/or electrostatic force on the sample surface.

2. The surface analyzer according to claim 1, further comprising:
wherein the detection unit is provided to detect the displacement of the cantilever, the displacement detection unit has a laser source, a lens, a beam splitter, a mirror, and a photodetector, and a laser beam emitted from the laser source and converged by the lens is reflected by the beam splitter, and cast onto the tip of the cantilever and reflected; and then the reflected light is received by the mirror and redirected to the photodetector.

3. The surface analyzer according to claim 1, wherein the range specifier displays a rectangular frame on the range-indicating image and allows users to translate, resize, and rotate the rectangular frame to specify a range to be analyzed.

* * * * *